US008874614B2

(12) United States Patent
Patton

(10) Patent No.: US 8,874,614 B2
(45) Date of Patent: *Oct. 28, 2014

(54) METHOD AND SYSTEM FOR ENFORCING ONTOLOGICAL CONTEXT RULES FOR OBJECT-ORIENTED PROGRAMS

(75) Inventor: Richard D. Patton, St. Paul, MN (US)

(73) Assignee: Infor (US), Inc., Alpharetta, GA (US)

( * ) Notice: Subject to any disclaimer, the term of this patent is extended or adjusted under 35 U.S.C. 154(b) by 2039 days.

This patent is subject to a terminal disclaimer.

(21) Appl. No.: 10/857,343

(22) Filed: May 28, 2004

(65) Prior Publication Data

US 2005/0289501 A1  Dec. 29, 2005

(51) Int. Cl.
*G06F 17/30* (2006.01)
*G06F 9/44* (2006.01)

(52) U.S. Cl.
CPC ................................... *G06F 9/4425* (2013.01)
USPC .......................................................... 707/793

(58) Field of Classification Search
USPC .......................................................... 707/102
See application file for complete search history.

(56) References Cited

U.S. PATENT DOCUMENTS

| | | | | |
|---|---|---|---|---|
| 5,878,411 | A * | 3/1999 | Burroughs et al. | 707/4 |
| 6,314,555 | B1 * | 11/2001 | Ndumu et al. | 717/101 |
| 6,601,234 | B1 * | 7/2003 | Bowman-Amuah | 717/108 |
| 6,640,231 | B1 | 10/2003 | Anderson et al. | |
| 6,938,041 | B1 * | 8/2005 | Brandow et al. | 707/10 |
| 2002/0023261 | A1 * | 2/2002 | Goodwin et al. | 717/146 |
| 2003/0005412 | A1 * | 1/2003 | Eanes | 717/120 |
| 2004/0216087 | A1 * | 10/2004 | Wilson et al. | 717/116 |

FOREIGN PATENT DOCUMENTS

| | | |
|---|---|---|
| EP | 1327941 A2 | 7/2003 |
| WO | WO-2005/119434 A2 | 12/2005 |
| WO | WO-2005119434 A3 | 12/2005 |

OTHER PUBLICATIONS

Horstmann, "Practical Object-Oriented Development in C++ and Java", Apr. 7, 1997, John Wiley & Sons, First Ed., P. cover page, copyright page, amazon.com search engine extracts.*
Sun Microsystems, "Java Compatible and Java Verified Products Drive Widespread Demand for Java Technology Enabled Solutions", May 15, 2003, www.sun.com, retrieved Dec. 20, 2006. ☐☐<http://www.sun.com/smi/Press/sunflash/2003-05/sunflash.20030515.2.xml>.*
USPTO.gov, "Java", Tess Database, Record 45 of 46, Query(Java[COMB] and Sun and Microsystems), Retrieved Dec. 20, 2006.*
OED.com, definition of "ontology", Jun. 2004, <Retrieved May 20, 2007>.*
M-W.com, definition of "ontological" and "ontological", <Retrieved May 20, 2007>.*
answers.com, "Java-Programming-Language", Retrieved May 25, 2007, <http://www.answers.com/topic/java-programming-language>.*
International Search Report for corresponding PCT Application No. PCT/US2005/018812, (Dec. 28, 2005), 4 pgs.

(Continued)

*Primary Examiner* — Khanh Pham
(74) *Attorney, Agent, or Firm* — Blank Rome LLP

(57) ABSTRACT

A method and apparatus for dynamically retrieving ontological context are described herein. In one embodiment, the method includes receiving pattern language code that includes definitions of business classes and field classes, wherein the field classes include ontological contexts. The method also includes generating high-level object-oriented code that includes the business classes and the field classes with ontological contexts.

21 Claims, 12 Drawing Sheets

(56) References Cited

OTHER PUBLICATIONS

Bonfatti, Flavio, et al., "Ontological Foundations for State and Identity Within the Object-Oriented Paradigm", *International Journal of Human-Computer Studies*, 43(5/6), (1995), 891-906.

Zhang, Hong, et al., "The GRITIKA Ontology for Modeling e-Service Applications: Formal Specifications and Illustrations", *Proceedings of the 37th Hawaii International Conference on System Sciences*, (2004), 1-10.

* cited by examiner

METHOD AND SYSTEM FOR ENFORCING ONTOLOGICAL CONTEXT RULES FOR OBJECT-ORIENTED PROGRAMS

LIMITED COPYRIGHT WAIVER

A portion of the disclosure of this patent document contains material to which the claim of copyright protection is made. The copyright owner has no objection to the facsimile reproduction by any person of the patent document or the patent disclosure as it appears in the U.S. Patent and Trademark Office file or records, but reserves all rights whatsoever.

FIELD

This invention relates generally to the field of software and more particularly to enforcing ontological context rules for object-oriented programs.

BACKGROUND

Most programming languages include a set of parameter/message passing mechanisms to pass data from one function or method to another. These mechanisms are often based on a mechanical metaphor that defines a "machine," which is insensitive to its context. Traditionally, reducing context sensitivity was important to sound machine design. Soundly designed machines traditionally have a rigidly defined small number of inputs and outputs. Machines are analogous to software functions and methods. Machine input/output interfaces are analogous to programming language parameter/message passing mechanisms. In the mechanical metaphor, a user determines the machine inputs. Thus "agency" is never in the machine, but is rather always in the machine user. Similarly, in the programming language paradigm, the "user" of the function or method determines what the inputs and outputs will be.

Although the mechanical metaphor is good for repeatedly performing simple tasks accurately, one disadvantage of machines, and thus mechanisms, is that machines do not react well to environmental changes. When environments change, machines do not typically adapt to such environmental changes. Similarly, typical programming language parameter/message passing mechanisms have an inherent mechanical rigidity, which inhibits adaptation to environmental changes. For example, a business application system is a computer model of a frequently changing human process. Human processes are complex adaptive systems, as they adapt to environmental changes. However, application software is typically very difficult to change because it uses parameter-passing mechanisms that "lock in" an original design, which becomes outdated as the human process changes. A disadvantage of typical programming language parameter/message passing mechanisms is that they have an inherent mechanical rigidity, which inhibits systems from adapting to environmental changes.

According to one prior art programming language, functions and their parameters must be declared at design time. Additionally, callers of a function must call the function using the function's name and its parameter names and types. With many parameter/message passing mechanisms, both calling and called routines must specify how parameters will be represented and interpreted. Parameter/message passing mechanisms also require that parameter representations be expressed at design time. When systems are modified, the parameter representations must be modified everywhere they are called. In large systems, parameters can be difficult to find and therefore, modifying parameters can be extremely difficult and expensive.

According to another prior art programming language, all parameter evaluations are done before the called routine or function begins to execute. One disadvantage of this prior art programming language is that early parameter evaluation can lead to redundant computation when certain parameters are not used within the routine or function.

BRIEF DESCRIPTION OF THE FIGURES

The present invention is illustrated by way of example and is limited in the Figures of the accompanying drawings in which.

DESCRIPTION OF THE EMBODIMENTS

A method and apparatus for dynamically retrieving ontological context rules are described herein. In the following description, numerous specific details are set forth. However, it is understood that embodiments of the invention may be practiced without these specific details. In other instances, well-known circuits, structures, and techniques have not been shown in detail so as not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with reference to the block diagrams could perform operations different than those discussed with reference to the flow diagrams. Moreover, it should be understood that although the flow diagrams depict serial operations, certain embodiments could perform certain of those operations in parallel.

Figure 1:
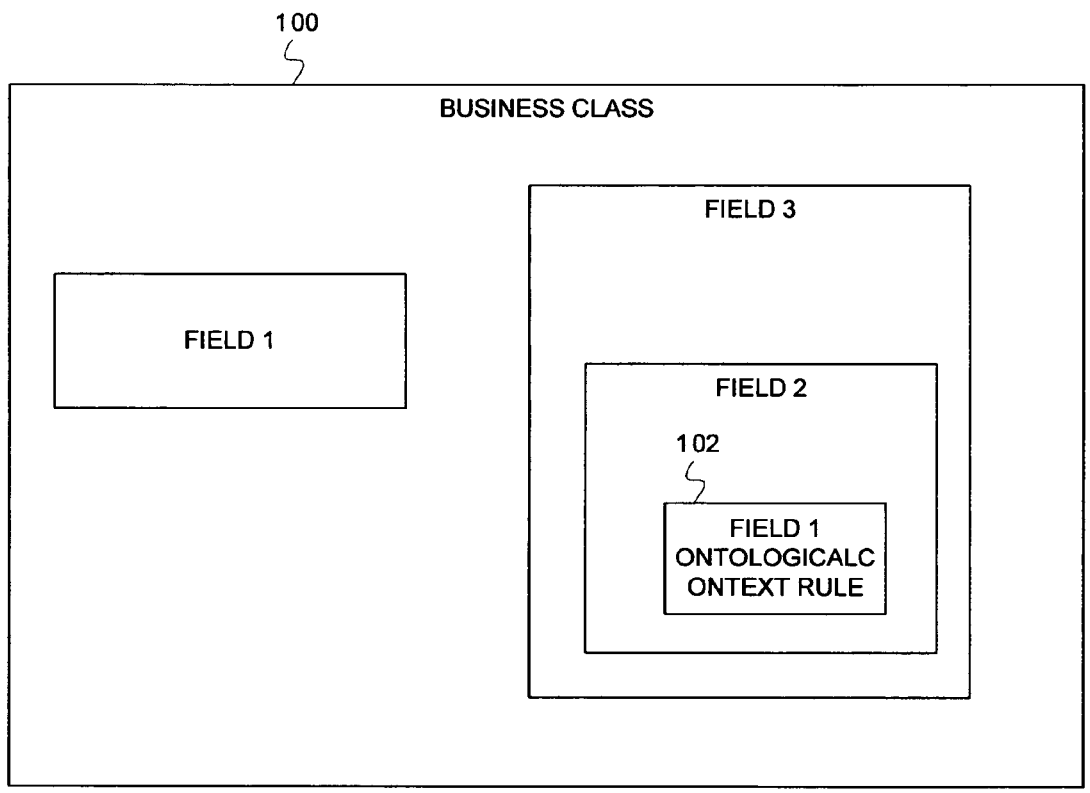
FIG. 1 is a diagrammatic representation of relationships between object-oriented classes, according to exemplary embodiments of the invention.

FIG. 1 is a diagrammatic representation of relationships between object-oriented classes, according to exemplary embodiments of the invention. As shown in FIG. 1, business class 100 includes Fields 1 and 3. Field 3 includes Field 2, which includes a Field 1 ontological context rule 102.

According to one embodiment, business classes (e.g., business class 100) are an abstract representation of persistent objects (e.g., objects stored in a relational database management system). In FIG. 1, Fields 1, 2, and 3 represent object-oriented classes within the business class 100. The Field 1 ontological context rule 102 requires that Field 2 be within Field 1's reachable ontological context when Field 1 is instantiated (reachable ontological contexts will be described in more detail below). Additionally, ontological context rules require that certain objects be within an object's reachable ontological context at compile time.

In particular, an ontological context rule specifies a field (or fields) that serves as an ontological context for a field the context rule is defined within. For example, an Employee 302 that has an ontological context rule indicating that the field is only valid, i.e., the field only has meaning, when it "finds itself" within the context of an HRCompany 305 (see FIG. 3). There is no meaning to an Employee field 302 without it being in the context of some HRCompany field. Ontological context rules give responsibility to the individual field to determine what context the field finds itself within. This overcomes a level of mechanical rigidity because ontological context rules allow fields to find themselves within an almost infinite number of contexts without requiring any changes to the field itself. Additionally, it is possible to change a field's ontological structure (embodied in its ontological context rules) without changing the field's context. The only requirement is that a field finds itself within its required ontological context.

One way the ontological context can change is for the field to be encapsulated within another field. For example, the Employee field 304 could be put within a Supervisor field (Supervisor field is not shown in the Figures). In this case, there is no need to change the Employee and Company fields, as the Employee field 304 would still find Company within its reachable ontological context. As another example, the ontological structure of Employee could change by specifying that it exists within Departments, which exist within Companies. In this case, only the ontological context rule of Employee would need to be changed, and as long as a Department field exists within its context, no other changes would be necessary.

An ontological context field is typically required to exist within the reachable context, although in some cases, it can be specified as being optional.

Figure 2:
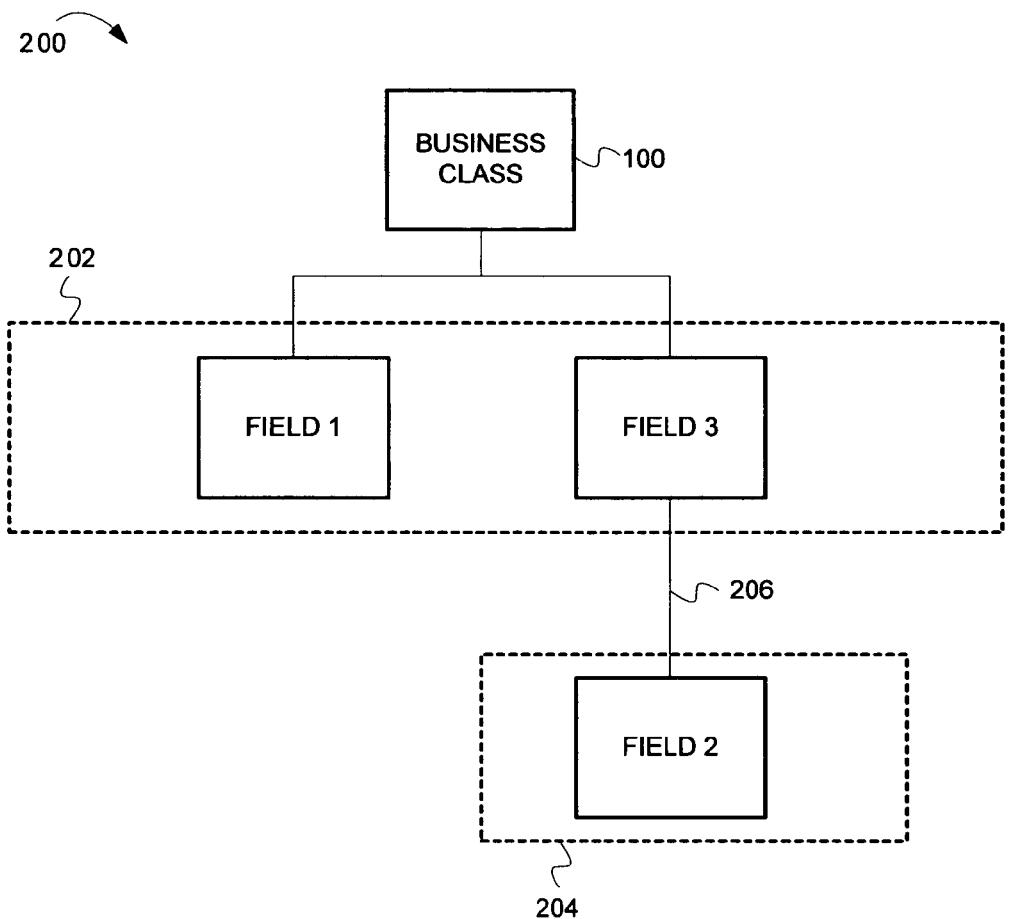
FIG. 2 is a tree diagram illustrating a class aggregation hierarchy defining reachable ontological contexts for field classes within a business class.

FIG. 2 is a tree diagram illustrating a class aggregation hierarchy defining reachable ontological contexts for field classes within a business class. The hierarchy 200 shows relationships between components of the business class 100 of FIG. 1. As shown in FIG. 2, the business class 100 is at the top of the hierarchy 200. Field 1 and Field 3 make up a middle hierarchy group 202. Field 2 makes up a lower hierarchy group 204. Field 3 is connected to the lower hierarchy group 204 by edge 206. The edge 206 shows an ontological context relationship between Field 3 and the fields in the hierarchy group 204 (i.e., Field 2). A field's reachable ontological context includes all fields in its hierarchy group and all fields within connected higher-lever hierarchy groups. For example, the reachable ontological context of Field 2 includes itself and Fields 1 and 3, because they are fields within a connected higher-level hierarchy group. As another example, Field 1's reachable ontological context includes only Field 3 because Field 3 is within Field 1's hierarchy group and because Field 1 has no connected higher-level hierarchy groups. A more detailed example of a field's reachable ontological context is described below, in the discussion of FIG. 4.

Figure 3:
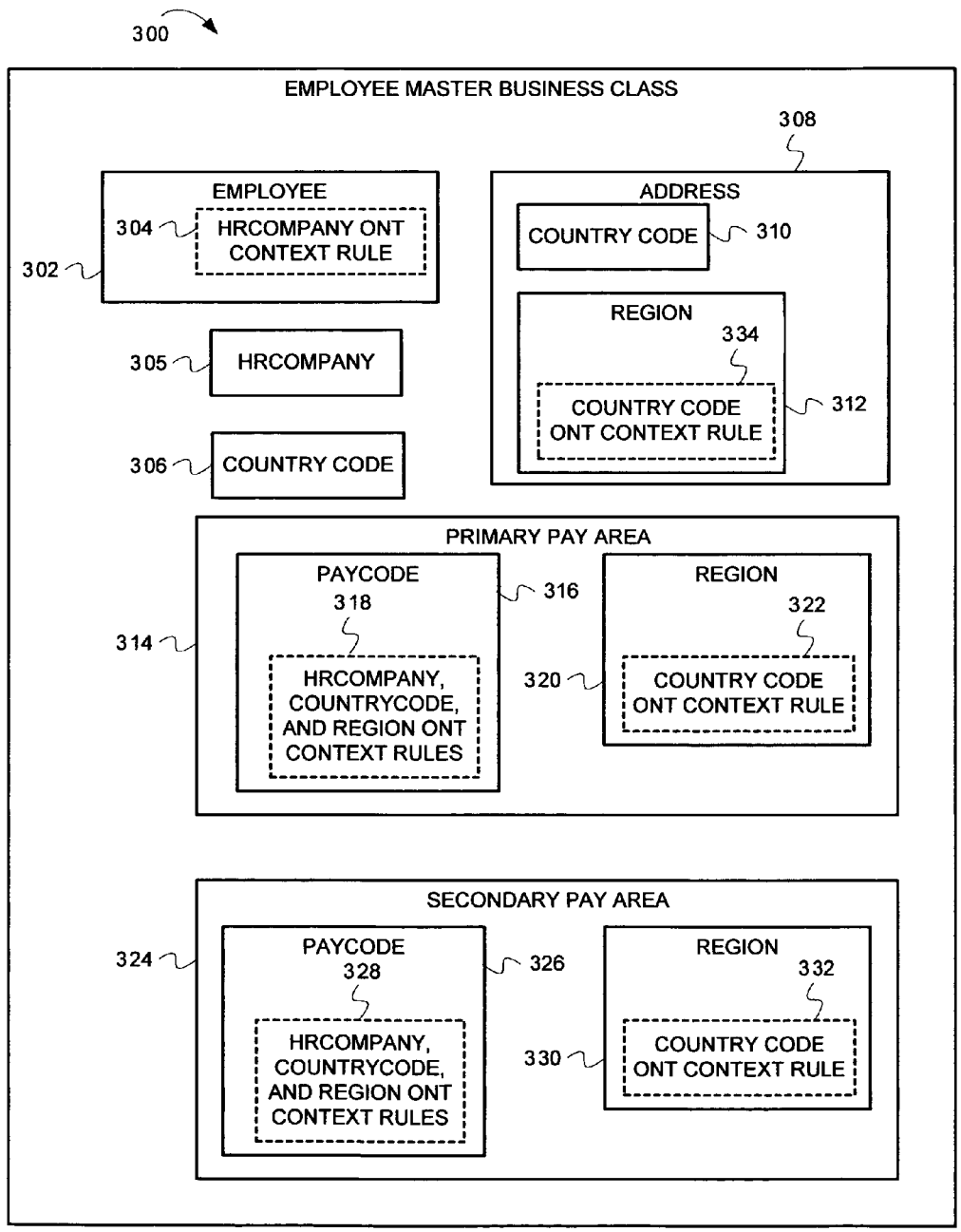
FIG. 3 is a diagrammatic representation of relationships between fields in an employee master business class, according to exemplary embodiments of the invention.

FIG. 3 is a diagrammatic representation of relationships between fields in an employee master business class, according to exemplary embodiments of the invention. The employee master business class 300 is presented to provide a more detailed description of the object-oriented relationships discussed above. FIG. 3 presents the employee master business class 300 as an abstract representation of a pattern language or high-level object-oriented language class definition. For example, the employee master business class 300 can be defined in a pattern language (e.g., Lawson Pattern Language, which is available from Lawson Software, Inc. of St. Paul, Minn.; the JAVA ™ programming language (object-oriented), available from Sun Microsystems of Santa Clara, Calif.; or any other suitable object-oriented programming language. The Lawson Pattern Language (LPL) definition of the employee master business class 300 can be seen below, in Appendix A.

As shown in FIG. 3, the employee master business class 300 includes an employee field 302, country code field 306, HRCompany field 305, address field 308, primary pay area field 314, and a secondary pay area field 324. The employee field 302 includes an HRCompany ontological context rule 304. The address field 308 includes a country code field 310 and a region is field 312, which includes a country code ontological context rule 334. The primary pay area field 314 includes a paycode field 316, which includes HRCompany, country code, and region ontological context rules 318. The pay area field 314 also includes a region field 320, which includes a country code ontological context rule 322. The secondary pay area field 324 includes a paycode field 326, which includes HRCompany, country code, and region ontological context rules 328. The secondary pay area field 324 also includes a region field 330, which includes a country code ontological context rule 332.

As described above in the discussion of FIG. 1, the ontological context rules require that certain fields be within a field's reachable ontological context at compile time. For example, in FIG. 3, the region field's country code ontological context rule 334 requires the region field 312 to have a country code field within the region's reachable ontological context. As another example, the paycode field's context rules require the paycode field 318 to have HRCompany, country code, and region fields within its reachable ontological context at compile time. The reachable ontological context of each of the employee master business class fields is described in FIG. 4 below.

Figure 4:
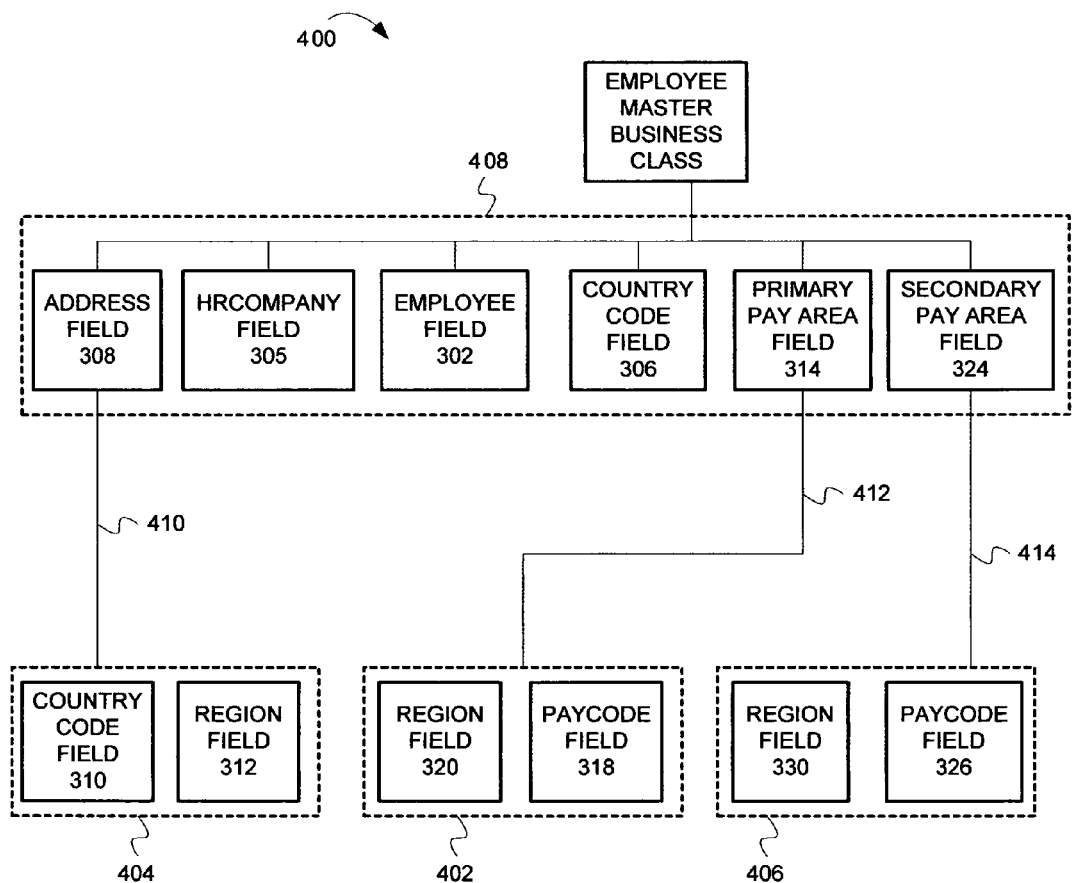
FIG. 4 is a tree diagram illustrating a class hierarchy defining reachable ontological contexts for field classes within a business class.

FIG. 4 is a tree diagram illustrating a class hierarchy defining reachable ontological contexts for field classes within a business class. The hierarchy 400 shows relationships between fields of the employee master business class 300 of FIG. 3. As shown in FIG. 4, the employee master business class 300 is above the hierarchy 400, while there are four hierarchy groups at two hierarchy levels below. The first hierarchy group 408 includes the address field 308, HRCompany field 305, employee field 302, country code field 306, primary pay area field 314, and secondary pay area field 324. The second, third, and fourth hierarchy groups are at a hierarchy level below the first hierarchy group 408. The second hierarchy group 404, which is connected to the address field 308 by edge 410, includes a country code field 310 and a region field 312. The third hierarchy group 402, which is connected to the primary pay area field 314 by edge 412, includes region field 320 and paycode field 318. The fourth hierarchy group 406 includes a region field 330 and a paycode field 326. The fourth hierarchy group 406 is connected to the secondary pay area field 324 by edge 414.

Each field of the employee master business class 300 has a reachable ontological context. Each field's reachable ontological context includes every field in its own hierarchy group and every field in the connected higher-level hierarchy group. For example, the second hierarchy group's (404) country code field 310 and region field 312 have reachable ontological contexts that include every field in their own hierarchy group (404) and every field in the first hierarchy group 408, which is a connected higher-level hierarchy group. The reachable ontological context of each field in the third and fourth hierarchy groups is determined in the same way.

While FIGS. 1-4 describe relationships among fields within a business class, FIGS. 5-10 describe a system architecture and operations for processing ontological context rules.

Figure 5:
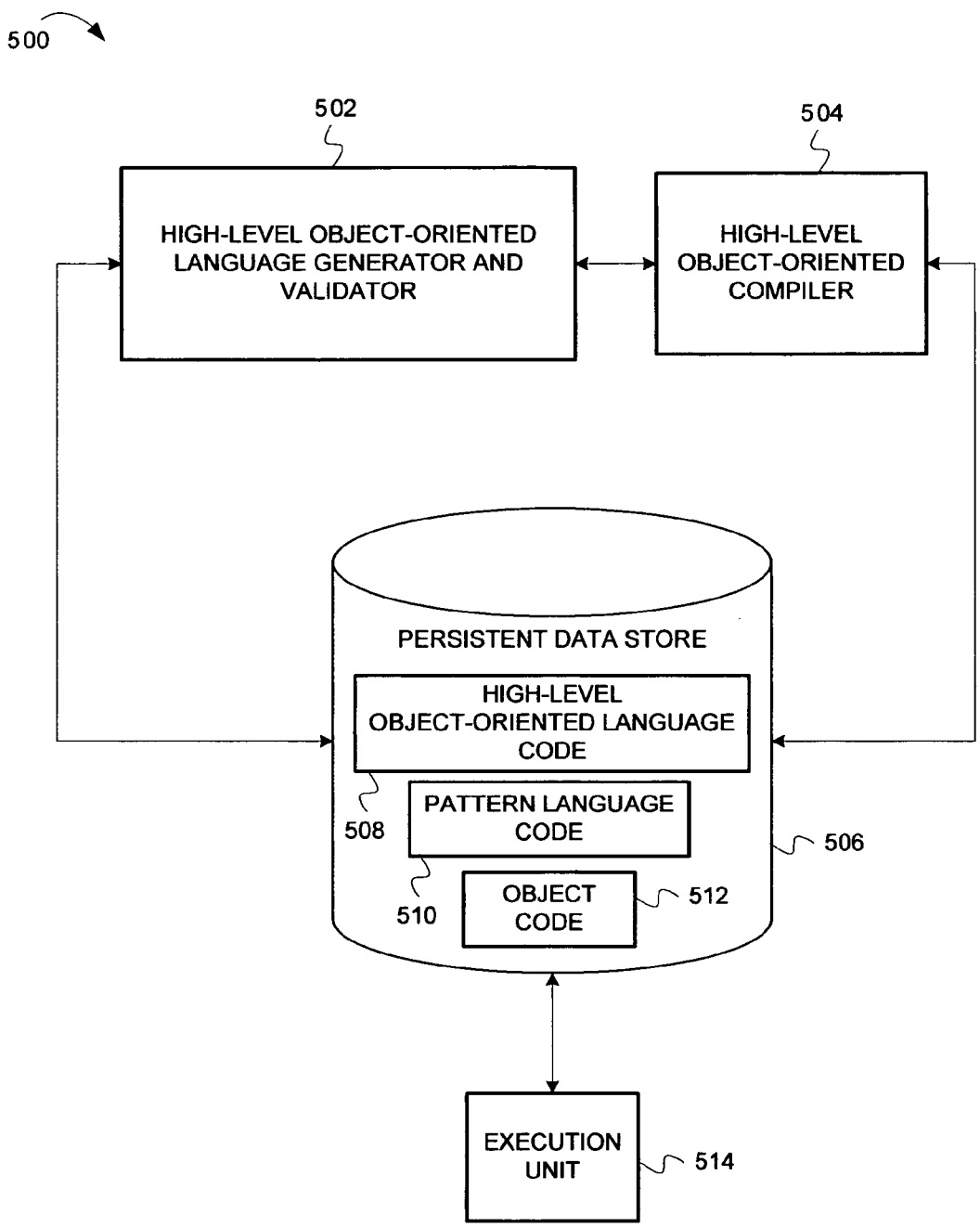
FIG. 5 is a block diagram illustrating a system for storing and processing programming language code containing ontological context rules.

FIG. 5 is a block diagram illustrating a system for storing and processing programming language code containing ontological context rules. Operations for the system will be described in greater detail below, in the discussion of FIGS. 6-10. As shown in FIG. 5, the system 500 includes a persistent data store 506. When the system 500 is operational, the persistent data store includes a high-level object-oriented language code 508, pattern language code 510, and object code 512. However, prior to operation, the persistent data store 506 may include only the pattern language code 510.

The persistent data store 506 is connected to a high-level object-oriented language generator and validator 502, which generates high-level object-oriented language code that contains ontological context rules. The generator 502 is connected to a high-level object-oriented compiler 504, which is connected with the persistent data store 506. The persistent data store 506 is also connected to an execution unit 514. In one embodiment, the execution unit 514 contains all elements necessary for executing the object code 512. For example, the execution unit 514 can contain a processor, memory, and software, such as a JAVA™ runtime environment (available from Sun Microsystems of Santa Clara, Calif.).

The system 500 can create and store tree diagrams, such as those discussed above (see FIGS. 2 and 4). More specifically, the system 500 can create data structures, such as tree diagrams, for representing the reachable ontological context of each field of a business class. The system 500 can use the tree diagrams to enforce context rules contained within an LPL or JAVA™ code program, as described below.

Any of the functional units shown in FIG. 5 or otherwise used with embodiments of the invention can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, etc. According to embodiments of the invention, the functional units can be other types of logic (e.g., digital logic) for executing the operations described herein.

Figure 6:
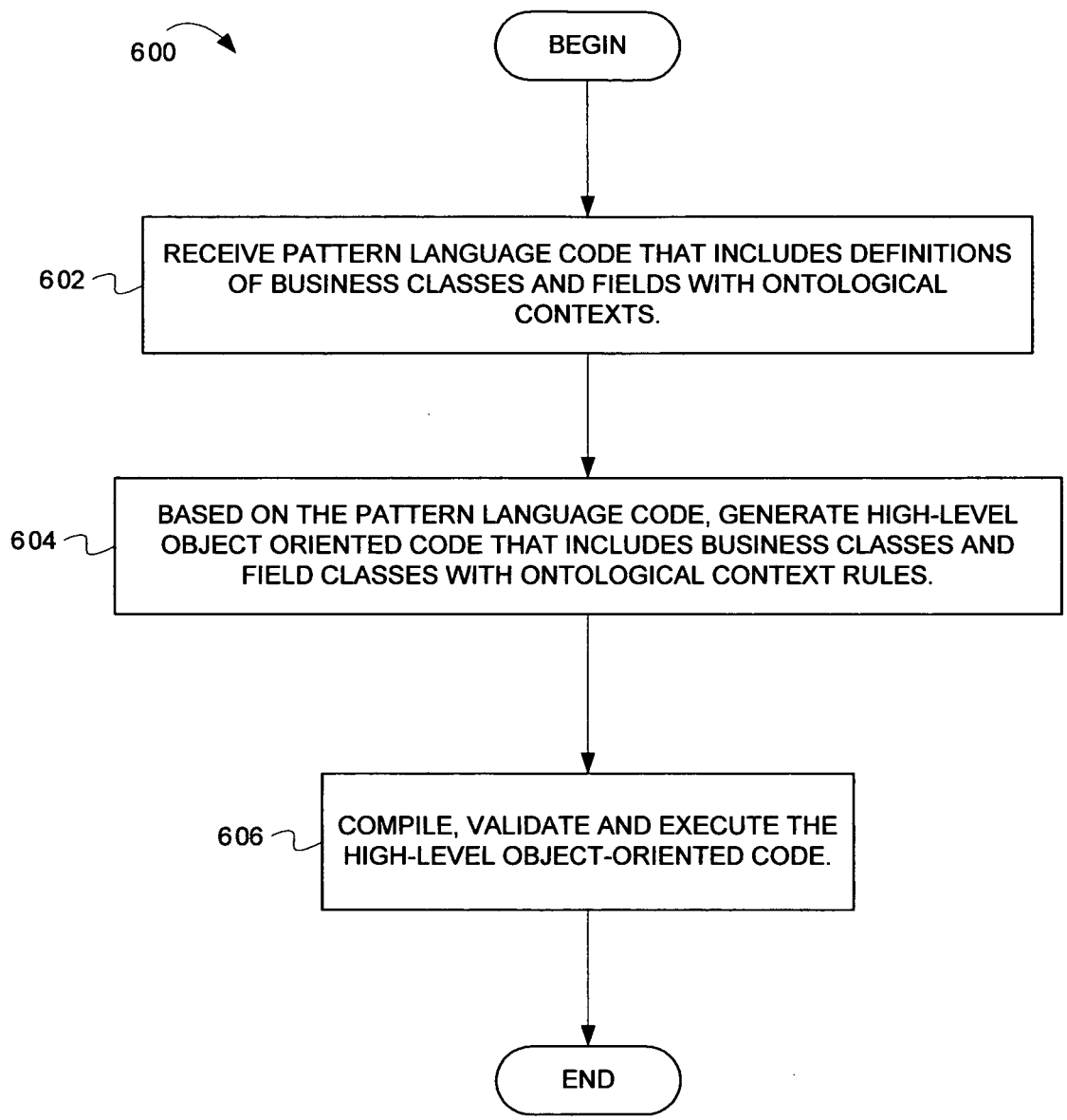
FIG. 6 is a flow diagram illustrating general operations for translating pattern language code into high-level object-oriented code.

FIG. 6 is a flow diagram illustrating general operations for translating pattern language code into high-level object-oriented code. The flow diagram 600 will be described with reference to the exemplary system shown in FIG. 5. The flow diagram commences at block 602.

At block 602, pattern language code including definitions of business classes, fields, and ontological context rules, is received. For example, the high-level object-oriented language generator and validator 502 receives pattern language code 510 from the persistent data store 506. A pattern language code example can be found in Appendix A. From block 602, the flow continues at block 604.

At block 604, high-level object-oriented code is generated based on the pattern language code, where the high-level object-oriented code includes business classes, field classes, and ontological context rules. In one embodiment, the high-level object-oriented code is generated using known scanning, parsing, and code-generating techniques. In one embodiment, the high-level object-oriented code is JAVA™ code. The operations of block 604 are described in greater detail below, in the discussion of FIG. 7. From block 604, the flow continues at block 606.

At block 606, high-level object-oriented language code is compiled, validated, and executed. For example, the high-level object-oriented language code 508 is compiled and validated by the high-level object-oriented compiler 504. The high-level object-oriented compiler 504 stores the compiled high-level object-oriented language code in the persistent data store 506 as object code 512. From block 606, the flow ends.

Figure 7:
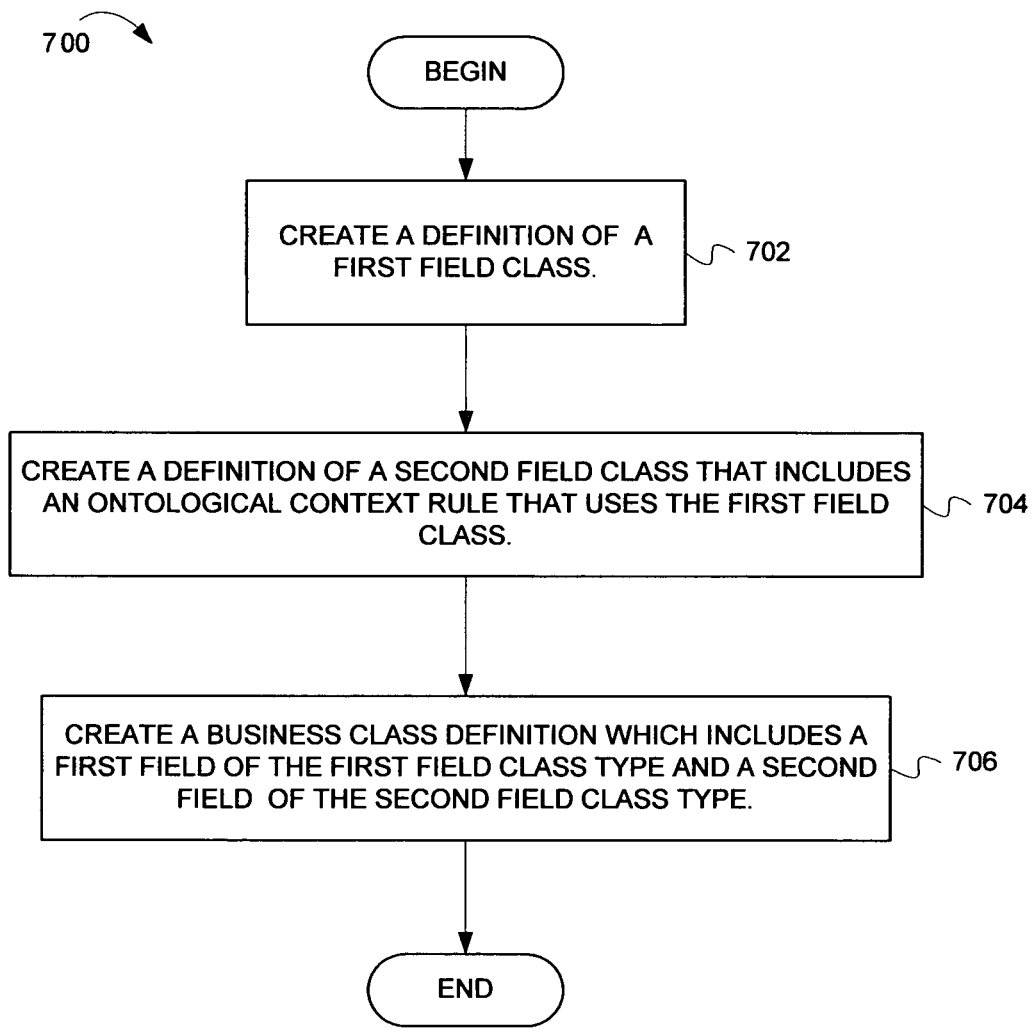
FIG. 7 is a flow diagram illustrating operations for generating field and business class definitions that use the concepts of ontological context, according to embodiments of the invention.

FIG. 7 is a flow diagram illustrating operations for generating field and business class definitions that use the concepts of ontological context, according to embodiments of the invention. According to embodiments, the field and business class definitions can be represented in JAVA™ code. The operations of the flow diagram 700 will be described with reference to the exemplary embodiments shown in FIGS. 4 and 5. The flow diagram 700 commences at block 702.

At block 702, a definition of a first field class is created. For example, the high-level object-oriented language generator and validator 502 creates a first field class definition based on the pattern language code 508. As a more specific example, the high-level object-oriented language generator and validator 502 creates a JAVA™ class definition for the HR Company field 305 based on an LPL representation of the HRCompany field 305. From block 702, the flow continues at block 704.

At block 704, a definition of a second field class is created, where the second field class definition includes an ontological context rule that uses the first field class. For example, the high-level object-oriented language generator and validator 502 creates a second field class definition, which includes a context rule that uses the first field class (the first field class was defined at block 702). As a more specific example, the high-level object-oriented language generator and validator 502 creates a JAVA™ class definition for the employee field 302, which includes an ontological context rule 304 that uses the HRCompany field 305. From block 704, the flow continues at block 706.

At block 706, a definition of a business class is created, where the business class definition includes first and second fields of the first and second field class types, respectively. For example, the high-level object-oriented language generator and validator 502 creates a business class definition that includes the second field and the first field, where the first field is within the second field's reachable ontological context. From block 706, the flow ends.

It should be apparent to one of ordinary skill in the art that the flow 700 could be modified to create high-level object-oriented language definitions for all fields of the employee master business class 300 or any other user-defined business class. Moreover, as indicated above, commonly known scanning, parsing, and code generating techniques are employed in the process of creating the definitions discussed above. After creating the field and business class definitions, the system 500 validates the ontological context relationships between business class fields, as described in the discussion of FIG. 8.

Figure 8:
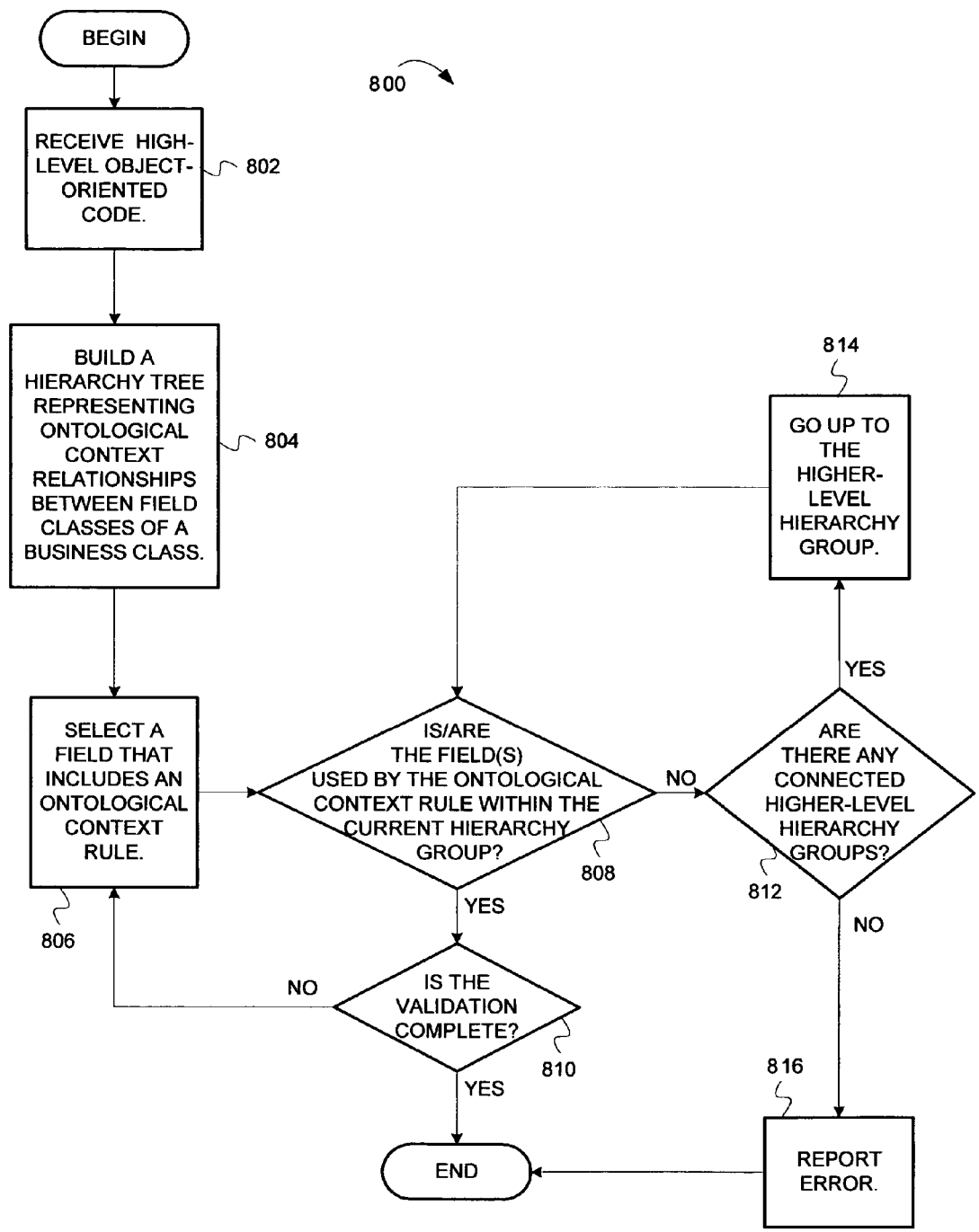
FIG. 8 is a flow diagram illustrating operations for validating ontological context rules.

FIG. 8 is a flow diagram illustrating operations for validating ontological context rules. The operations of flow diagram 800 will be described with reference to the hierarchy tree of FIG. 4 and the exemplary system of FIG. 5. The flow diagram 800 commences at block 802.

At block 802, a high-level object-oriented code is received. For example, the high-level object-oriented language generator and validator 502 receives high-level object-oriented code from the persistent data store 506. The flow continues at block 804.

At block 804, a hierarchy tree representing ontological context relationships between field classes of a business class is built. For example the high-level object-oriented language generator and validator 502 builds a hierarchy tree representing ontological context relationships between field classes of a business class. In one embodiment, the hierarchy tree is like those shown in FIGS. 2 and 4. The flow continues at block 806.

At block 806, a field that includes an ontological context rule is selected. For example, the high-level object-oriented language generator and validator 502 selects a field from the hierarchy tree that includes one or more ontological context rules. The flow continues at block 808.

At block 808, it is determined whether the field used by the ontological context rule is within the current hierarchy group. For example, the high-level object-oriented language generator and validator 502 inspects the selected field's hierarchy group and determines whether the required field is within the hierarchy group. If the field is within the hierarchy group, the flow continues at block 810. Otherwise, the flow continues at block 812.

At block 810, it is determined whether the validation is complete. For example, the high-level object-oriented language generator and validator 502 determines whether there are additional fields to validate (i.e., are there additional fields for which the reachable ontological context must be searched). If the validation is complete, the process ends. Otherwise, the flow continues at block 806.

At block 812, it is determined whether there are any connected higher-level hierarchy groups. For example, the high-level object-oriented language generator and validator 502 determines whether there are any higher-level hierarchy groups connected to the current hierarchy group. That is, the validator 502 determines whether it can continue its search for the required field in additional higher-level hierarchy groups. If there are other connected higher-level hierarchy groups, the flow continues at block 814. Otherwise, the flow continues at block 816.

At block 814, the hierarchy tree is traversed to the higher-level hierarchy group. For example, the high-level object-oriented language generator and validator 502 traverses the hierarchy tree along an edge to the connected higher-level hierarchy group. The flow continues at block 808.

At block 816, an error is reported. For example, the high-level object-oriented language generator and validator 502 reports an error when it cannot find a required field in the appropriate reachable ontological context. From block 816, the flow ends.

Figure 9:
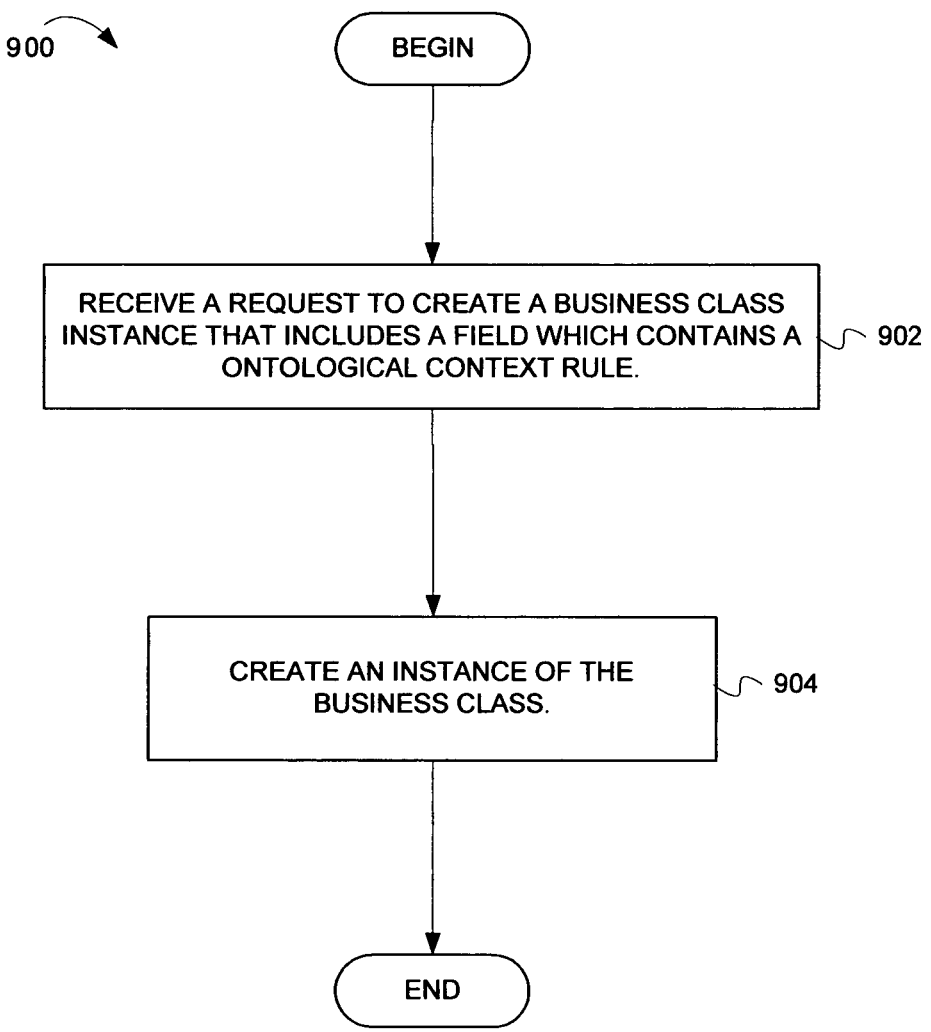
FIG. 9 is a flow diagram illustrating operations for instantiating a business class, according to exemplary embodiments of the invention.
Figure 10:
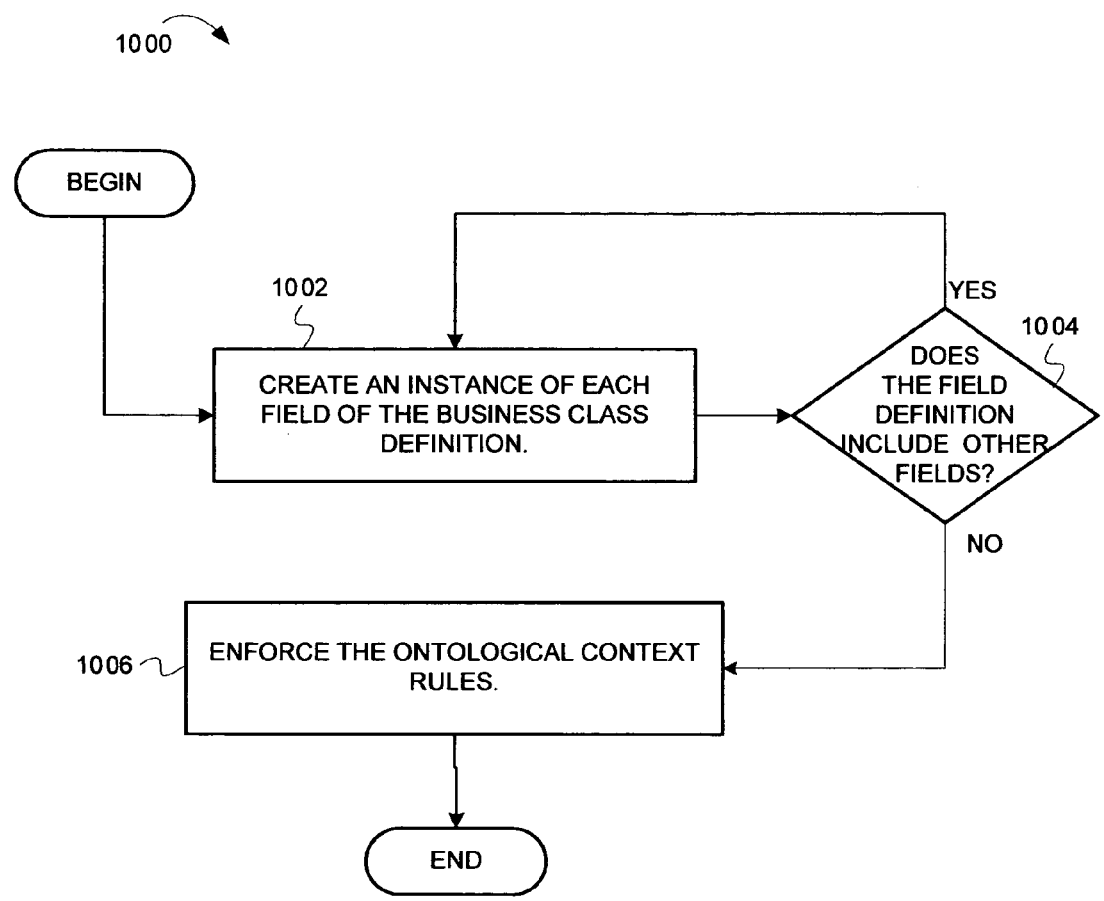
FIG. 10 is a flow diagram illustrating more detailed operations for creating an instance of a business class (see block 904), according to exemplary embodiments of the invention.
Figure 11:
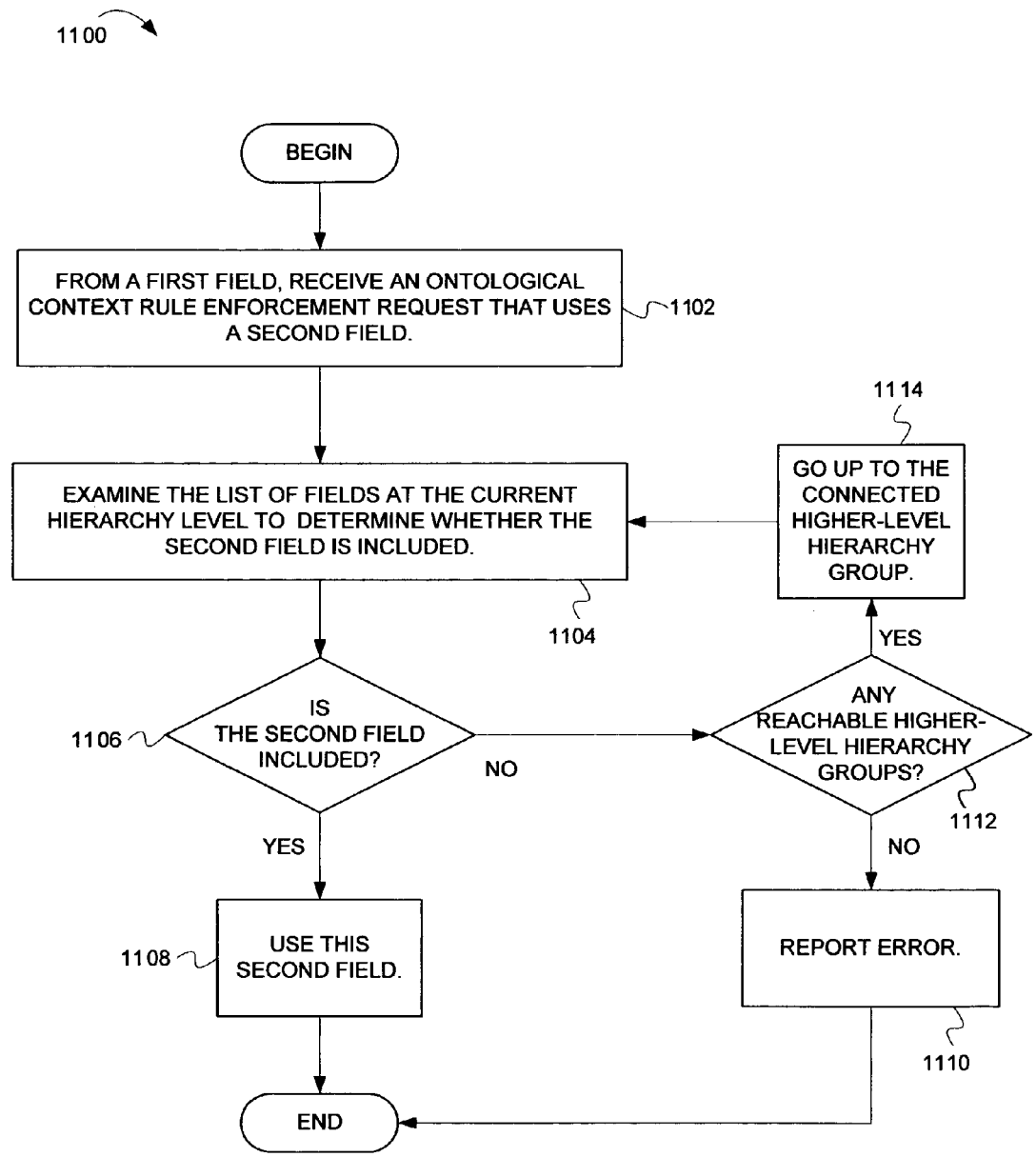
FIG. 11 is a flow diagram illustrating operations for enforcing ontological context rules.

While FIGS. 7-8 describe operations for creating and validating field and business class definitions prior to runtime, FIGS. 9-11 describe operations for instantiating and validating ontological context relationships for field and business classes at runtime.

FIG. 9 is a flow diagram illustrating operations for instantiating a business class, according to exemplary embodiments of the invention. The flow diagram 900 will be described with reference to the exemplary system shown in FIG. 5. The flow diagram 900 commences at block 902.

At block 902, a request to create a business class including a field that contains a context rule is received. For example, the execution unit 514 receives a request to create a business class that includes a field containing a context rule. From block 902, the flow continues at block 904.

At block 904, an instance of the business class is created. For example, the execution unit 514 instantiates the business class. From block 904, the flow ends.

FIG. 10 is a flow diagram illustrating more detailed operations for creating an instance of a business class (see block 904) according to exemplary embodiments of the invention. The flow diagram 1000 will be described with reference to the exemplary system shown in FIG. 5. The flow diagram 1000 commences at block 1002.

At block 1002, an instance of each field is created in the definition of the business class. For example, the execution unit 514 instantiates each field of the employee master business class 300. The flow continues at block 1004.

At block 1004, a determination is made about whether the field definition includes other fields. For example, the execution unit 514 determines whether the field definition includes other fields. If the field definition includes other fields, the flow continues at block 1002. Otherwise, the flow continues at block 1006.

At block 1006, the ontological context rules are enforced. For example, the execution unit 514 forces the ontological context rules. A more detailed explanation of enforcing the ontological context rules is given below, in the discussion of FIG. 11. From block 1006, the flow ends.

FIG. 11 is a flow diagram illustrating operations for enforcing ontological context rules. The operations of flow diagram 1100 will be described with reference to the hierarchy tree of FIG. 4 and the exemplary system of FIG. 5. The flow diagram 1100 commences at block 1102.

At block 1102, an ontological context rule enforcement request about a second field is received from a first field. For example, the execution unit 514 receives from a first field a context enforcement request about a second field. In the following operations, the execution unit 514 will use a hierarchy tree (see FIGS. 2 and 4) to enforce the ontological context rules. The flow continues at block 1104.

At block 1104, the hierarchy group of the first field is searched to determine whether the second field is included within the first field's hierarchy group. For example, the execution unit 514 searches the first field's hierarchy group for the second field. The flow continues at block 1106.

At block 1106, it is determined whether the second field is included within the first field's hierarchy group. If the first field is within the second field's hierarchy group, the flow continues at block 1108. Otherwise, the flow continues at block 1112.

At block 1108, the second field is used to impose the context rule on the first field. For example, the execution unit 514 uses the second field to impose the context rule on the first field. From block 1108, the flow ends.

At block 1112, it is determined whether there are any reachable higher-level hierarchy groups. If there are additional higher-level hierarchy groups, the flow continues at block 1114. Otherwise, the flow continues at block 1110.

At block 1114, the search continues at a connected higher-level hierarchy group. For example, the execution unit 514 traverses the hierarchy tree to a connected higher-level hierarchy group. From block 1114, the flow continues at block 1104.

At block 1110, an error is reported. For example, the execution unit 514 reports an error. From block 1110, the flow ends.

Hardware and Operating Environment

This section provides an overview of the exemplary hardware and the operating environment in which embodiments of the invention can be practiced.

Figure 12:
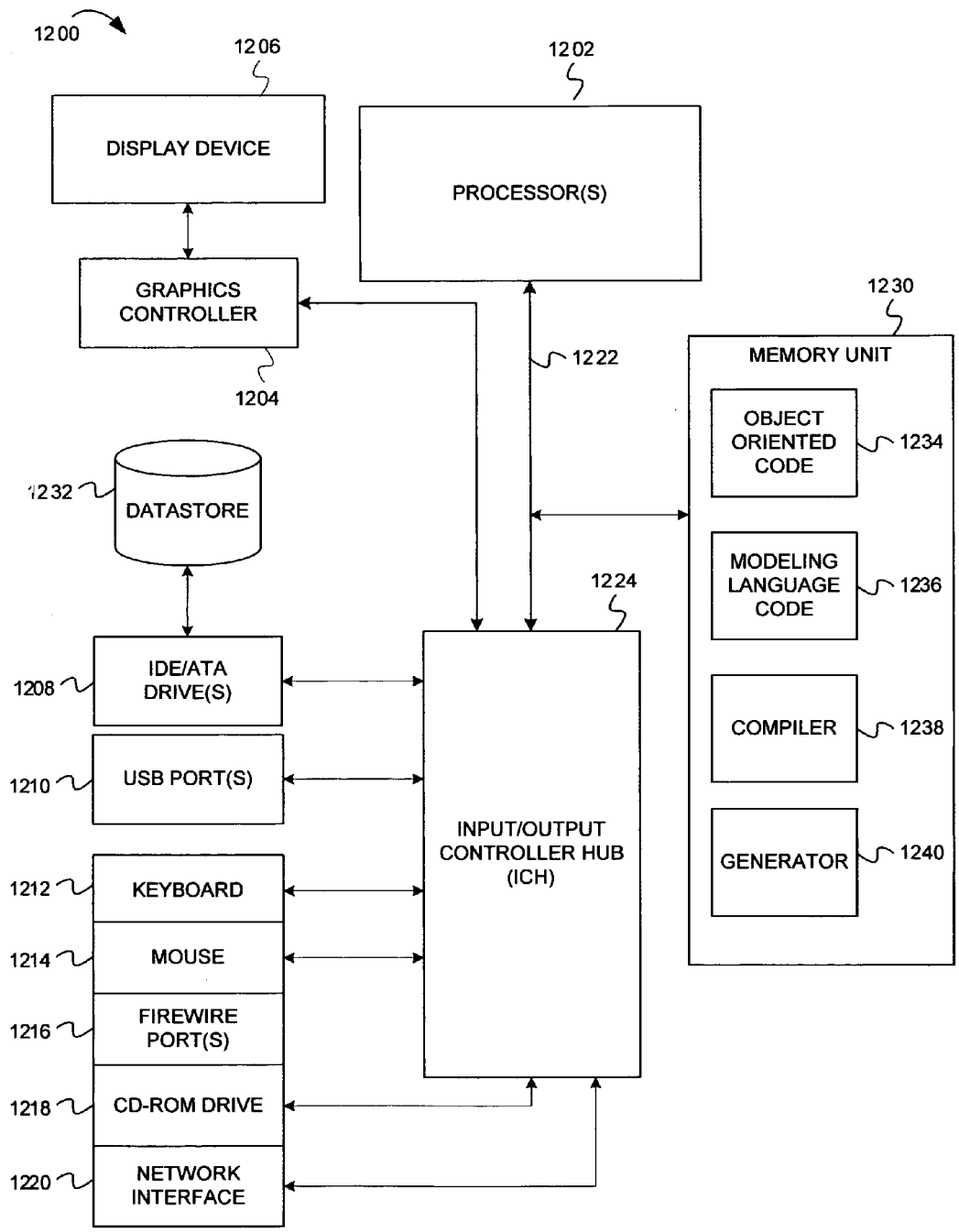
FIG. 12 illustrates an exemplary computer system used with certain embodiments of the invention.

FIG. 12 illustrates an exemplary computer system used with certain embodiments of the invention. As illustrated in FIG. 12, computer system 1200 comprises processor(s) 1202. The computer system 1200 also includes a memory unit 1230, processor bus 1222, and Input/Output controller hub (ICH) 1224. The processor(s) 1202, memory unit 1230, and ICH 1224 are coupled to the processor bus 1222. The processor(s) 1202 may comprise any suitable processor architecture. The computer system 1200 may comprise one, two, three, or more processors, any of which may execute a set of instructions in accordance with embodiments of the present invention.

The memory unit 1230 stores data and/or instructions, and may comprise any suitable memory, such as a dynamic random access memory (DRAM). The computer system 1200 also includes IDE drive(s) 1208 and/or other suitable storage devices. A graphics controller 1204 controls the display of information on a display device 1206, according to embodiments of the invention.

The input/output controller hub (ICH) 1224 provides an interface to I/O devices or peripheral components for the computer system 1200. The ICH 1224 may comprise any suitable interface controller to provide for any suitable communication link to the processor(s) 1202, memory unit 1230, and/or to any suitable device or component in communication with the ICH 1224. For one embodiment of the invention, the ICH 1224 provides suitable arbitration and buffering for each interface.

For one embodiment of the invention, the ICH 1224 provides an interface to one or more suitable integrated drive electronics (IDE) drives 1208, such as a hard disk drive (HDD) or compact disc read only memory (CD ROM) drive, or to suitable universal serial bus (USB) devices through one or more USB ports 1210. For one embodiment, the ICH 1224 also provides an interface to a keyboard 1212, a mouse 1214, a CD-ROM drive 1218, one or more suitable devices through one or more firewire ports 1216. For one embodiment of the invention, the ICH 1224 also provides a network interface 1220 though which the computer system 1200 can communicate with other computers and/or devices.

In one embodiment, the computer system 1200 includes a machine-readable medium that stores a set of instructions (e.g., software) embodying any one, or all, of the methodologies for dynamically retrieving ontological context. Furthermore, software can reside, completely or at least partially, within memory unit 1230 and/or within the processor(s) 1202.

Thus, a method and system for enforcing ontological context rules have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

APPENDIX A

```
Address is a Field
    Representation
        Group Fields
            AddressLine1        is Alpha size 30
            AddressLine2        is Alpha size 30
            City                is Alpha size 30
            StateProv           is Alpha size 2
            PostalCode          is Alpha size 10
            CountryCode
            Region
        Field Rules
            AddressLine1     required
            City             required
            StateProv        required
            PostalCode       required
            CountryCode      required
Company is a BusinessClass
    owned by pt
    prefix is CMP
    Ontology
        symbolic key is Company
    Patterns
        implements CRUD
    Persistent Fields
        Name is Alpha size 30
Company is a KeyField
    Representation
        type is Numeric size 4
    Ontology
        business class is Company
Country is a BusinessClass
    prefix is CTY
    Ontology
        symbolic key is CountryCode
    Patterns
        implements CRUD
    Persistent Fields
        Name is Alpha size 50
CountryCode is a KeyField
    Representation
        type is Alpha size 2
    Ontology
        business class is Country
Employee is a KeyField
    Representation
        type is Numeric size 9
    Ontology
        business class is EmployeeMaster
    Context
        HRCompany
            delete restricted
```

APPENDIX A-continued

```
    Field Rules
        Employee
            if (Company.AutoSequence.Yes)
                autosequence using Company.LastEmployee
EmployeeDependent is a BusinessClass
    prefix is EMD
    Ontology
        part of EmployeeMaster
            relative key is Name is Alpha size 30
    Patterns
        implements CRUD
    Persistent Fields
        BirthDate is Date
    Derived Fields
        Age is a ComputeField
            type is Numeric size 2
            (current date - BirthDate)
EmployeeMaster is a BusinessClass
    prefix is EMP
    Ontology
        symbolic key is Employee
    Patterns
        implements CRUD
        implements Auditing
    Persistent Fields
        Name                    is Alpha size 50
        Address
        Workcountry             is a CountryCode
        PrimaryPayArea          is a PayArea
        SecondaryPayArea        is a PayArea
    Derived Fields
        StandardweeklyPay is a ComputeField
            (PrimaryPayArea.PayCode.PayRate *40)
    Field Rules
        Name                    required
        Address                 required
        Workcountry             required
        PrimaryPayArea          required
HRCompany is a KeyField
    extends Company
    Ontology
        business class is HRCompanyData
HRCompanyData is a BusinessClass
    prefix is HRC
    Ontology
        symbolic key is HRCompany
    Patterns
        implements CRUD
    Persistent Fields
        Name                    is Alpha size 50
        LastEmployee            is Numeric size 9
        AutoSequence            is Alpha size 1
            States
                Yes value is "Y"
                No value is "N"
    Field Rules
        Name required
        AutoSequence
            default to AutoSequence.No
NumberOfPeriods is a Field
    Representation
        type is Numeric size 2
        States
            Quarterly           value is 4
            Monthly             value is 12
            4Weekcycle          value is 13
            Weekly              value is 52
PayArea is a Field
    Representation
        Group Fields
            Region
            PayCode
        Field Rules
            Region      required
            Paycode     required
PayCode is a KeyField
    Representation
        type is Alpha size 5
    Ontology
        business class is PaycodeTable
        Context
            HRCompany
            CountryCode
                optional
            Region
                optional
    Patterns
        implements Specialization
PayCodeTable is a BusinessClass
    prefix is PAY
    ontology
        symbolic key is PayCode
    Patterns
        implements CRUD
        implements Auditing
    Persistent Fields
        Description             is Alpha size 50
        PayRate                 is Decimal size 4.4
PeriodCalendar is a Field
    Representation
        Group Fields
            FiscalYear is Year
            NumberofPeriods
            PeriodEndDates
    Field Rules
        FiscalYear
            default to current date
        NumberofPeriods
            default to NumberofPeriods.Monthly
        PeriodEndDates
            required
PeriodEndDates is a Field
    Representation
        Date is Date
            occurs 52 times
        Context
            NumberofPeriods
        Field Rules
            PeriodEndDates
                array size is NumberofPeriods
                edit increasing sequence
                edit contiguous
Region is a BusinessClass
    prefix is RGN
    ontology
        symbolic key is Region
    Patterns
        implements CRUD
    Persistent Fields
        Name is Alpha size 50
    Field Rules
        Name required
Region is a KeyField
    Representation
        type is Alpha size 10
    ontology
        business class is Region
        Context
            CountryCode
                delete cascades
```

The invention claimed is:

1. A method comprising:

receiving pattern language code that includes definitions of a business class and field classes, wherein the field classes include ontological context rules; and generating high-level object-oriented code that includes the business classes and the field classes with ontological contexts.

2. The method of claim 1, wherein the ontological context rules indicate which of the field classes must be within the reachable ontological context of certain of the field classes.

3. A method comprising:
creating a definition for a first field class;
creating a definition for a second field class, wherein the second field class includes an ontological context rule, and wherein the ontological context rule uses the first field class; and
generating object-oriented code that includes a definition for a business class that includes a second field and a first field, wherein the first field is within the reachable ontological context of the second field, wherein the first field is related to the first field definition, and wherein the second field is related to the second field definition.

4. The method of claim 3 further comprising:
receiving a pattern language code segment.

5. A method comprising:
receiving a request to create a business class that includes a field that has an ontological context rule; and
creating an instance of the business class.

6. The method of claim 5, wherein the business class includes one or more fields, and wherein the creating an instance of the business class includes,
creating an instance of each field; and
enforcing ontological context rules.

7. The method of claim 6, wherein the enforcing includes,
receiving from a first field an ontological context rule enforcement request about a second field, wherein the first field is in a first hierarchy group;
examining fields of the first hierarchy group to determine whether the second field is in the first hierarchy group;
if the second field is in the first hierarchy group, using the second field of the first hierarchical level;
if the second field is not included in the first hierarchy group, searching a second hierarchy group of a second hierarchical level to determine whether the second field is in the second hierarchical level; and
if the second field is in the second hierarchy-group, using the second field of the second hierarchical level.

8. A method comprising:
generating object-oriented code that includes a plurality of field classes, wherein generating comprises,
determining reachable ontological contexts for a plurality of field classes of a business class, wherein certain of the field classes include ontological context rules, and wherein each of the ontological context rules uses at least one of the plurality of field classes;
selecting one of the certain field classes, wherein the selected certain field class includes one of the ontological context rules, and wherein the one of the ontological context rules uses one of the plurality of field classes; and
determining whether the selected certain field class' reachable ontological context includes the one of the plurality of field classes.

9. The method of claim 8, wherein the determining a reachable ontological context includes:
creating a hierarchy tree representing ontological context relationships between the plurality of field classes of the business class.

10. The method of claim 8, wherein the plurality of field classes and the business class are represented in pattern language code.

11. A system comprising:
a persistent data store to store pattern language code that includes ontological context rules; and
a high-level object-oriented language generator and validator, configured for execution by a processor, to generate high-level object-oriented language code from the pattern language code, wherein the high-level object-oriented language code includes definitions of business classes and field classes, wherein the field classes include ontological contexts.

12. A non-transitory machine-readable medium that provides instructions, which when executed by a machine, cause the machine to perform operations comprising:
receiving pattern language code that includes definitions of a business class and field classes, wherein the field classes include ontological context rules; and
generating high-level object-oriented code that includes the business classes and the field classes with ontological contexts.

13. The non-transitory machine-readable medium of claim 12, wherein the ontological context rules indicate which of the field classes must be within the reachable ontological context of certain of the field classes.

14. A non-transitory machine-readable medium that provides instructions, which when executed by a machine, cause the machine to perform operations comprising:
creating a definition for a first field class;
creating a definition for a second field class that includes an ontological context rule,
wherein the ontological context rule uses the first field class; and generating object-oriented code that includes a definition for a business class that includes a second field and a first field, wherein the first field is in the reachable ontological context of the second field, wherein the first field is related to the first field definition, and wherein the second field is related to the second field definition.

15. The non-transitory machine-readable medium of claim 14 further comprising: receiving a pattern language code segment.

16. A non-transitory machine-readable medium that provides instructions, which when executed by a machine, cause the machine to perform operations comprising:
receiving a request to create a business class that includes a field that has an ontological context rule; and
generating object-oriented code that includes an instance of the business class.

17. The non-transitory machine-readable medium of claim 16, wherein the business class includes one or more fields, and wherein the business class creation includes,
creating an instance of each field; and
enforcing ontological context rules.

18. The non-transitory machine-readable medium of claim 16, wherein the enforcing includes,
receiving from a first field an ontological context rule enforcement request about a second field, wherein the first field is in a first hierarchy group;
examining fields of the first hierarchy group to determine whether the second field is in the first hierarchy group;
if the second field is in the first hierarchy group, using the second field of the first hierarchical level;
if the second field is not included in the first hierarchy group, searching a second hierarchy group of a second hierarchical level to determine whether the second field is in the second hierarchical level; and
if the second field is in the second hierarchy-group, using the second field of the second hierarchical level.

19. A non-transitory machine-readable medium that provides instructions, which when executed by a machine, cause the machine to perform operations comprising:
generating object-oriented code that includes a plurality of field classes, wherein generating comprises, determining reachable ontological contexts for a plurality of field classes of a business class, wherein certain of the field classes include ontological context rules, and wherein each of the ontological context rules uses at least one of the plurality of field classes;

selecting one of the certain field classes, wherein the selected certain field class includes one of the ontological context rules, and wherein the one of the ontological context rules uses one of the plurality of field classes; and determining whether the selected certain field class' reachable ontological context includes the one of the plurality of field classes.

20. The non-transitory machine-readable medium of claim 19, wherein the determining a reachable ontological context includes:

creating a hierarchy tree representing ontological context relationships among the plurality of field classes of the business class.

21. The non-transitory machine-readable medium of claim 19, wherein the plurality of field classes and the business class are represented in pattern language code.

* * * * *